(12) United States Patent
Noguchi

(10) Patent No.: US 8,166,209 B2
(45) Date of Patent: Apr. 24, 2012

(54) COMPUTER SYSTEM PROVIDED WITH HYPERVISOR

(75) Inventor: Ryota Noguchi, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/292,007

(22) Filed: Nov. 8, 2011

(65) Prior Publication Data

US 2012/0054749 A1  Mar. 1, 2012

Related U.S. Application Data

(62) Division of application No. 12/629,229, filed on Dec. 2, 2009, now Pat. No. 8,078,765.

(30) Foreign Application Priority Data

Mar. 19, 2009 (JP) ................. 2009-067266

(51) Int. Cl.
*G06F 3/00* (2006.01)
(52) U.S. Cl. ............................. 710/5; 710/36
(58) Field of Classification Search ............ 710/5, 36
See application file for complete search history.

(56) References Cited

U.S. PATENT DOCUMENTS

| | | | |
|---|---|---|---|
| 7,003,771 | B1 | 2/2006 | Arndt |
| 7,539,788 | B2 | 5/2009 | Moriki et al. |
| 2006/0155667 | A1* | 7/2006 | Tolba ............... 707/1 |
| 2008/0155167 | A1 | 6/2008 | Mansell et al. |
| 2009/0019208 | A1 | 1/2009 | Sanvido et al. |

FOREIGN PATENT DOCUMENTS

| | | |
|---|---|---|
| JP | 2003-202999 A | 7/2003 |
| JP | 2004-220218 A | 8/2004 |

* cited by examiner

*Primary Examiner* — Chun-Kuan Lee
*Assistant Examiner* — David Martinez
(74) *Attorney, Agent, or Firm* — Mattingly & Malur, PC

(57) ABSTRACT

A hypervisor acquires an I/O command that has been issued from a virtual computer. The hypervisor judges whether or not a target of an I/O that complies with the I/O command is an unassigned port associated device that is a device associated with an I/O port that is coupled to an I/O controller that is not assigned to a virtual computer that is an issuing source of the I/O command. In the case in which the result of the judgment is positive, the hypervisor does no execute an I/O to the unassigned port associated device, and returns a virtual execution result to the virtual computer that is an issuing source of the I/O command.

1 Claim, 10 Drawing Sheets

COMPUTER SYSTEM PROVIDED WITH HYPERVISOR

CROSS-REFERENCE TO PRIOR APPLICATION

This application is a divisional of U.S. patent application Ser. No. 12/629,229, filed Dec. 2, 2009, which relates to and claims the benefit of priority from Japanese Patent Application number 2009-67266, filed on Mar. 19, 2009 the entire disclosure of which is incorporated herein by reference.

BACKGROUND

The present invention generally relates to a computer system provided with a hypervisor.

A computer system provided with a hypervisor is known as a computer system (for instance, see Patent Citation 1). For a computer system of this kind, a hypervisor or a virtual computer is activated on a physical computer system in general. The physical computer system is provided with a hardware resource (such as a processor and a memory).

Moreover, for a computer system of this kind, an address translation technique is adopted for managing a relationship between a guest physical address and an actual host physical address for a virtual computer most commonly. As an address translation technique, a technique that is disclosed in Patent Citation 2 is known for instance.

PATENT CITATION 1

Japanese Patent Application Laid-Open Publication No. 2003-202999

PATENT CITATION 2

Japanese Patent Application Laid-Open Publication No. 2004-220218

SUMMARY

A physical computer system is provided with a controller of an I/O (Input/Output) device (an I/O controller). As an I/O controller, there are mentioned for instance a respectively independent controller and a composite I/O controller provided with a plurality of I/O controllers.

A composite I/O controller is provided with a plurality of I/O ports. Each I/O controller in the composite I/O controller can share the plurality of I/O ports. One I/O controller of the plurality of I/O controllers has a function for executing a connection control that indicates an I/O port and an I/O controller that is coupled to the I/O port. Each I/O controller controls an I/O device that is coupled to the I/O port via the I/O port that is coupled to the I/O controller.

By utilizing an address translation technique, a separate I/O controller can be assigned to an individual virtual computer. By this configuration, while one virtual computer utilizes one I/O device, another virtual computer can utilize another I/O device.

However, an individual virtual computer cannot separately utilize an I/O device in some cases. More specifically, such a case occurs in the case in which a target of an I/O command that has been issued from a virtual computer is a device that is associated with an I/O port that is coupled to an I/O controller that is not assigned to the virtual computer.

An object of the present invention is to prevent that an individual virtual computer cannot separately utilize an I/O device for a computer system provided with a composite I/O controller with which a plurality of I/O devices are linked.

A hypervisor acquires an I/O command that has been issued from a virtual computer. The hypervisor judges whether or not a target of an I/O that complies with the I/O command is an unassigned port associated device that is a device associated with an I/O port that is coupled to an I/O controller that is not assigned to a virtual computer that is an issuing source of the I/O command. In the case in which the result of the judgment is positive, the hypervisor does no execute an I/O to the unassigned port associated device, and returns a virtual execution result to the virtual computer that is an issuing source of the I/O command.

For instance, "a virtual execution result" described here is an execution result in which it is seen as if no I/O device is coupled to a port associated with a target of an I/O from a point of view of a virtual computer.

In the case in which the result of the judgment is negative, the hypervisor can execute an I/O that complies with the I/O command, that is, an I/O to a device that is a target of an I/O.

The hypervisor judges whether or not a target of an I/O is an unassigned port associated device that is a device associated with an I/O port that is coupled to an I/O controller that is not assigned to a virtual computer that is an issuing source of the I/O command. In the case in which the result of the judgment is positive, the hypervisor does no execute an I/O to the unassigned port associated device. By this configuration, it can be prevented that an individual virtual computer cannot separately utilize an I/O device for a computer system provided with a composite I/O controller with which a plurality of I/O devices is coupled.

DETAILED DESCRIPTION OF THE EMBODIMENT

Some embodiments in accordance with the present invention will be described below in detail with reference to the drawings.

Embodiment 1

Figure 1:
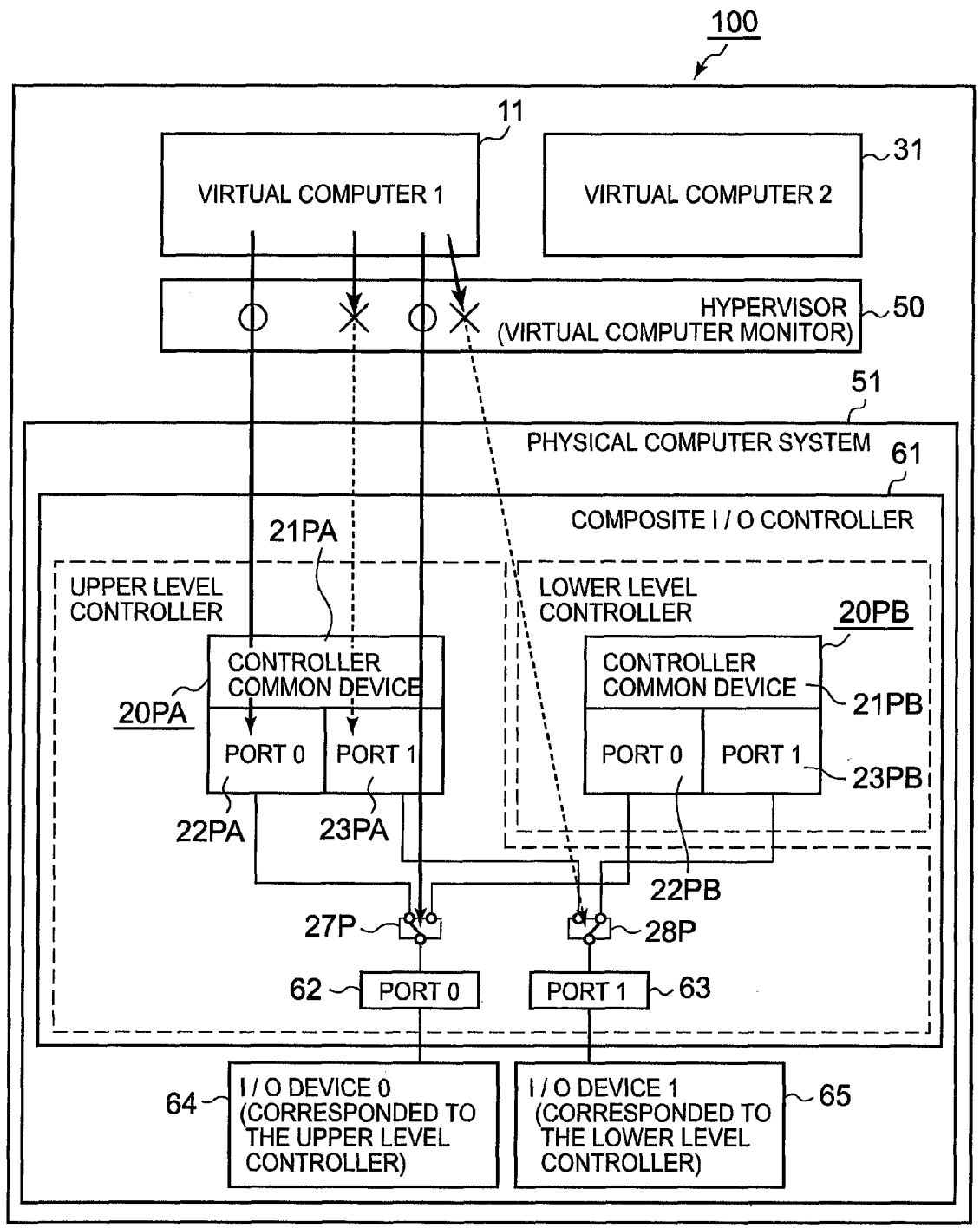
FIG. 1 is a schematic view showing a computer system 100 in accordance with an embodiment 1 of the present invention.

FIG. 1 is a schematic view showing a computer system 100 in accordance with an embodiment 1 of the present invention.

A hypervisor 50 and a plurality of virtual computers are executed on a physical computer system 51. As a virtual computer, there can be mentioned for instance a virtual computer 1 (11) to which an upper level controller 20PA described later is assigned and a virtual computer 2 (31) to which a lower level controller 20PB is assigned (hereafter referred to as a virtual computer 1 and a virtual computer 2 as a matter of practical convenience).

The physical computer system 51 is provided with a composite I/O controller 61. The composite I/O controller 61 is provided with an I/O port 0 (62) and an I/O port 1 (63) as a plurality of I/O ports for instance (hereafter referred to as a port 0 and a port 1 as a matter of practical convenience). An I/O device 0 (64) is coupled to the port 0, and an I/O device 1 (65) is coupled to the port 1 (hereafter referred to as an I/O device 0 and an I/O device 1 as a matter of practical convenience). The I/O device 0 is an I/O device that is utilized by the virtual computer 1, and the I/O device 1 is an I/O device that is utilized by the virtual computer 2.

The composite I/O controller 61 is provided with an upper level controller 20PA and a lower level controller 20PB (the number of lower level controllers 20PB can also be 2 or more as described in an embodiment 3). As shown in FIG. 1, for elements that are common for the upper level controller and the lower level controller, an element in which the tail end of a referential mark is A is an element that is included in the upper level controller, and an element in which the tail end of a referential mark is B is an element that is included in the lower level controller.

As common elements that are included in the upper level controller 20PA and the lower level controller 20PB, there are a controller common device 21PA (21PB), a port 0 device 22PA (22PB), and a port 1 device 23PA (23PB). The controller common device 21PA (21PB) executes a command that is specified by the virtual computer 1 (the virtual computer 2) that is an assignment destination. The port 0 device 22PA (22PB) is a device that can be coupled to a port 0, and is provided with a register that stores a value that indicates whether or not an I/O device is coupled to a port 0. The port 1 device 23PA (23PB) is a device that can be coupled to a port 1, and is provided with a register that stores a value that indicates whether or not an I/O device is coupled to a port 1.

The upper level controller 20PA is an I/O controller that can switch a linked port. The lower level controller 20PB is an I/O controller that cannot control a switching of a linked port.

Consequently, as an element that is included in the upper level controller 20PA and that is not included in the lower level controller 20PB, there are a port 0 switch register 27P, a port 1 switch register 28P, a port 0, and a port 1. The register 27P is a register having a role for switching the controller 20PA and the controller 20PB to be coupled to the port 0 (the port 1). More specifically, the register 27P is coupled to the port 0 and the devices 22PA and 22PB, and stores a value that indicates which of the controller 20PA and the controller 20PB is coupled to the port 0. On the other hand, the register 28P is coupled to the port 1 and the devices 23PA and 23PB, and stores a value that indicates which of the controller 20PA and the controller 20PB is coupled to the port 1.

In the case in which the hypervisor 50 is activated, the hypervisor 50 configures a first value that indicates that the port 0 is coupled to the upper level controller 20PA for the register 27P, and configures a second value that indicates that the port 1 is coupled to the lower level controller 20PB for the register 28P.

Subsequently, in the case in which an I/O command that specifies an address range is issued from the virtual computer 1, the hypervisor 50 acquires the I/O command. The hypervisor 50 judges whether or not a target of an I/O that complies with the I/O command is an unassigned port associated device that is a device associated with the port 1 that is coupled to the lower level controller 20PB that is not assigned to the virtual computer 1. In the case in which the result of the judgment is negative, the hypervisor 50 can execute an I/O to a device that is a target of an I/O (for instance, a device associated with the port 0) in response to the acquired I/O command. On the other hand, in the case in which the result of the judgment is positive, the hypervisor 50 does no execute an I/O to the unassigned port associated device, and returns a virtual execution result to the virtual computer that is an issuing source of the I/O command.

As a device associated with a port, there are a register in the port 0 device 22PA (22PB), a register in the port 1 device 23PA (23PB), and switch registers 27P and 28P. Consequently, the unassigned port associated device is a register in the port 1 device 23PA and/or a port 1 switch register 28P in the case in which an issuing source of the I/O command is the virtual computer 1, and the unassigned port associated device is a register in the port 0 device 22PB in the case in which an issuing source of the I/O command is the virtual computer 2.

By the above control that is executed by the hypervisor 50, a value that has been stored into a register in the port 1 device 23PA and a value that has been stored into the port 1 switch register 28P can be prevented from being updated by the virtual computer 1. Moreover, since the upper level controller 20PA is not assigned to the virtual computer 2, the above values are not updated by the virtual computer 2. By the above reasons, the port 1 and the lower level controller 20PB can be prevented from being disconnected from each other when the virtual computer 2 utilizes the I/O device 1. As a result, the I/O device 1 can be prevented from being unrecognizable when the virtual computer 2 utilizes the I/O device 1.

The embodiments in accordance with the present invention will be described below in detail.

Figure 2:
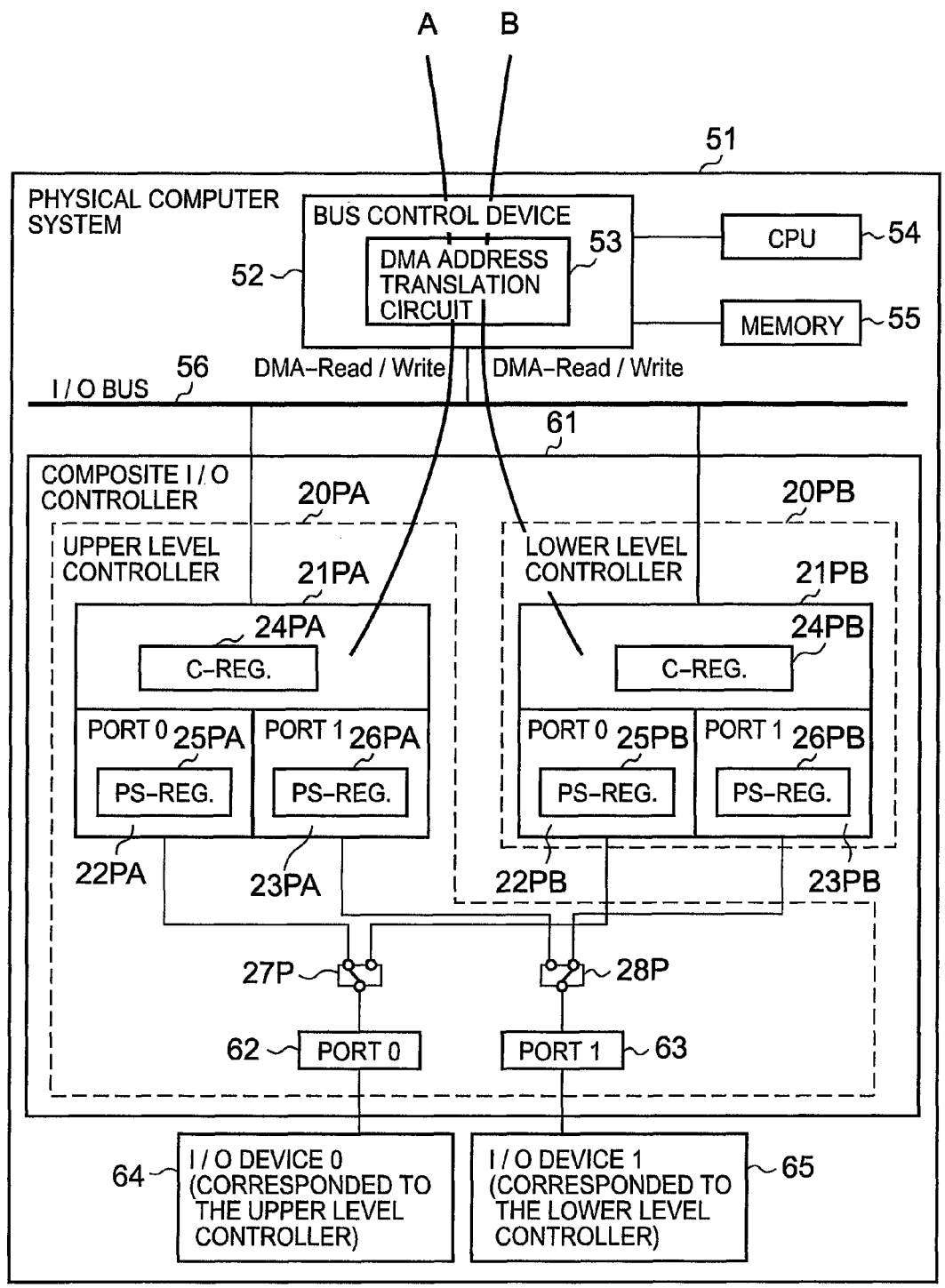
FIG. 2 shows a physical computer system 51 for the computer system 100.
Figure 3:
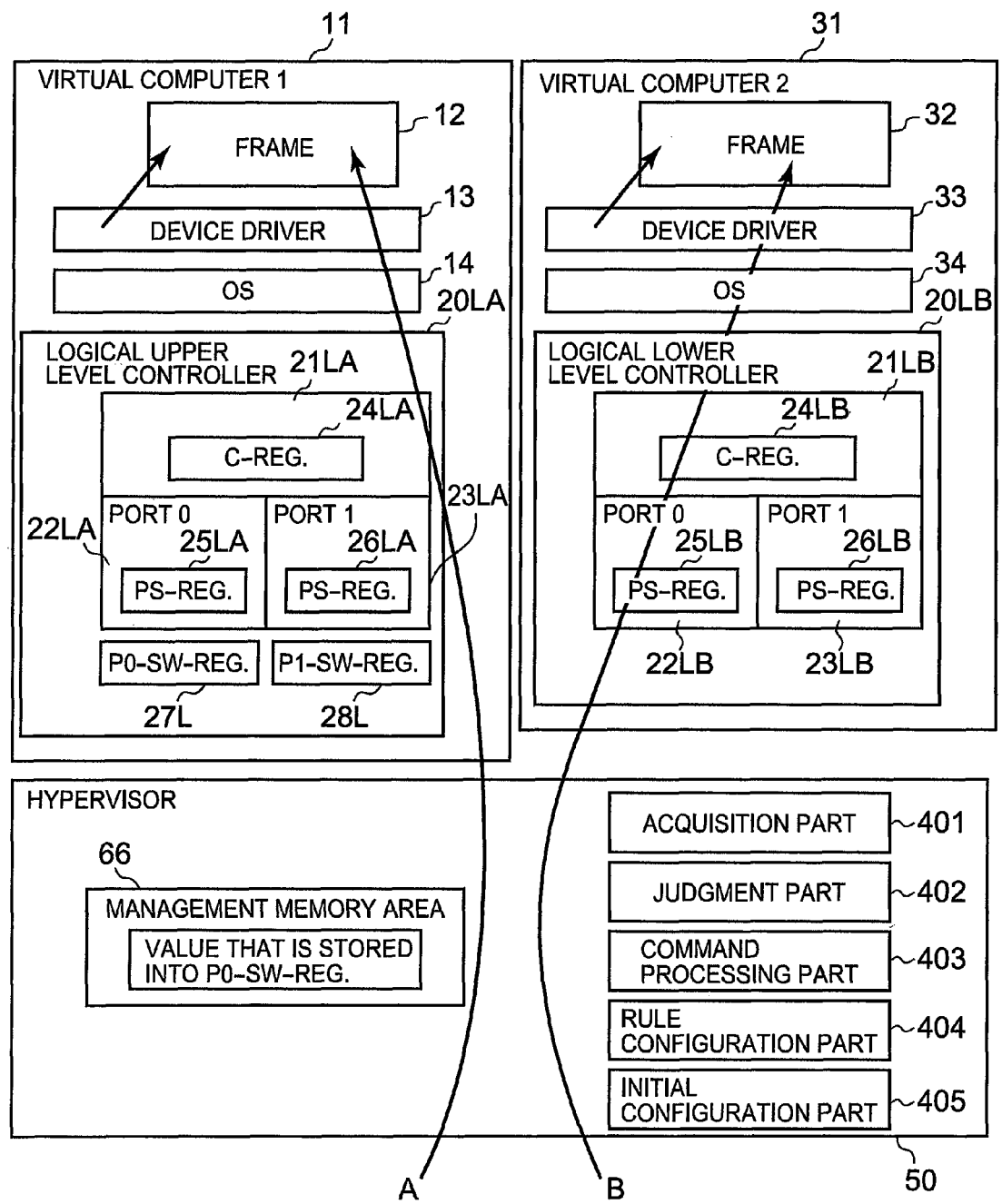
FIG. 3 shows the configurations of virtual computers 1 (11) and 2 (31) and a hypervisor 50 for the computer system 100.

FIG. 2 shows a physical computer system 51 for the computer system 100. FIG. 3 shows the configurations of virtual computers 1 (11) and 2 (31) and a hypervisor 50 for the computer system 100.

For the physical computer system 51, a bus control device 52 and a composite I/O controller 61 are coupled to an I/O bus 56. A CPU (Central Processing Unit) 54 and a memory 55 are coupled to the bus control device 52.

The bus control device 52 is a device (for instance, a circuit board) that controls a communication between elements that are coupled to the device 52. The bus control device 52 is provided with a DMA (Direct Memory Access) address translation circuit 53. The DMA address translation circuit 53 is a hardware circuit that executes an address translation processing in which an address specified during an access of a DMA is translated into another address.

A device 21PA (21PB) is provided with a command register 24PA (24PB) (referred to as C-REG. in the figure). One command register 24PA (24PB) exists for every controller. By writing a value to the command register 24PA (24PB), a controller 20PA (20PB) that is provided with the register 24PA (24PB) can be reset, and a processing of a command that has been created on a memory 55 (a frame 12 (32)) by a device driver 13 (33) described later can be started or terminated.

A port 0 device 22PA (22PB) is provided with a port status register 25PA (25PB) (referred to as PS-REG. in the figure). Similarly, a port 1 device 23PA (23PB) is provided with a port status register 26PA (26PB). The registers 25PA, 26PA, 25PB, and 26PB store a value that indicates whether or not an I/O device 0 or 1 is coupled to the corresponding port 0 or 1.

The registers 24PA, 25PA, 26PA, 24PB, 25PB, and 26PB described above are mapped to an address space that can be specified by the virtual computers 1 and 2 (for instance, an MMIO (Memory Mapped I/O) space and/or an I/O port space). For instance, the registers 24PA, 25PA, and 26PA included in the upper level controller 20PA is mapped to an MMIO space, and the registers 24PB, 25PB, and 26PB included in the lower level controller 20PB is mapped to an I/O port space.

As described above, the upper level controller 20PA is provided with the port switch registers 27P and 28P. The registers are prepared for every I/O port.

The composite I/O controller 61 as described above is a USB (Universal Serial Bus) controller for instance. More specifically, the upper level controller 20PA is an EHCI (Enhanced Host Controller Interface) controller (USB2.0 controller), and the lower level controller 20PB is a UHCI (Universal Host Controller Interface) controller (USB1.1 controller). The ports 0 and 1 are USB ports.

A connection between the port 0 and the I/O device 0 and a connection between the port 1 and the I/O device 1 are fixed for instance. Consequently, the I/O device 0 and 1 are not disconnected (for instance, not exchanged) in a mid course. As an I/O device of this kind, an I/O device that is included in a remote KVM (Keyboard, Video, Mouse) console can be mentioned for instance. The remote KVM console is coupled to the composite I/O controller 61 in a fixed manner by a wire on a board. In general, for the remote KVM console, one I/O device is a virtual input device that is linked by the USB1.1 (typically Keyboard/Mouse), and another I/O device is a virtual storage device that is linked by the USB2.0. In the case in which such a configuration is adopted, the virtual computer 2 can utilize a virtual input device when the virtual computer 1 installs software from a virtual storage device for instance in the present embodiment. Moreover, a virtual input device can be prevented from being unrecognizable by the virtual computer 2 when the virtual computer 2 utilizes the virtual input device.

The hypervisor 50 is activated on the physical computer system 51 as described above.

The hypervisor 50 manages a management memory area 66 for instance. A value that is held in the area 66 is a value that is stored into a logical port 1 switch register 28L as described later.

The hypervisor 50 is provided with functions such as an acquisition part 401, a judgment part 402, a command processing part 403, a rule configuration part 404, and an initial configuration part 405. The above functions are implemented by executing the hypervisor 50 by a CPU 54. The acquisition part 401 acquires an I/O command that is issued from the virtual computers 1 and 2, in particular an I/O command that specifies an address space to which a physical register has been mapped. The judgment part 402 judges whether or not a target of an I/O that complies with the I/O command is an unassigned port associated device that is a device associated with an I/O port that is coupled to an I/O controller that is not assigned to a virtual computer that is an issuing source of the I/O command. The command processing part 403 returns an I/O that complies with the I/O command and a virtual execution result without executing an I/O to a virtual computer that is an issuing source of the I/O command. The rule configuration part 404 configures an address translation rule to a memory space. The initial configuration part 405 configures a value to the registers such as the port switch registers 27P and 28P when the hypervisor is activated.

The hypervisor 50 that has been activated resets the composite I/O controller 61 for instance. The hypervisor 50 then configures a first value that indicates that the port 0 is coupled to the upper level controller 20PA for the port 0 switch register 27P in the upper level controller 20PA, and configures a second value that indicates that the port 1 is coupled to the lower level controller 20PB for the port 1 switch register 28P.

The hypervisor 50 defines the virtual computer 1 and the virtual computer 2. The hypervisor 50 (the rule configuration part 404) configures an address translation rule for the upper level controller 20PA to a memory space of the virtual computer 1 for the memory 55. Similarly, the hypervisor 50 configures an address translation rule for the lower level controller 20PB to a memory space of the virtual computer 2 for the memory 55. By the above configuration, the upper level controller 20PA can execute a DMA to a memory area of the virtual computer 1, and the lower level controller 20PB can execute a DMA to a memory area of the virtual computer 2. Both of the upper level controller 20PA and the lower level controller 20PB cannot execute a DMA to other than a memory area of the virtual computer to which the upper level controller 20PA or the lower level controller 20PB is assigned.

More specifically, a logical upper level controller 20LA is configured to the virtual computer 1. As shown in FIGS. 2 and 3, an element in which the tail end of a referential mark is P is an element that is included in the physical I/O controller, and an element in which the tail end of a referential mark is L is an element that is included in the logical I/O controller. In other words, the logical upper level controller 20LA is provided with a logical controller common device 21LA, a logical port 0 device 22LA, a logical port 1 device 23LA, and a logical port switch register 27L (28L). The device 21LA is provided with a logical command register 24LA, and the device 22LA is provided with a logical port status register 25LA (26LA). The logical registers 24LA, 25LA, 26LA, 27L, and 28L is an address space to which the physical registers 24PA, 25PA, 26PA, 27P, and 28P have been mapped (for instance, an MMIO space). For instance, an I/O to a logical register 28L is an I/O to a physical register 28P.

Similarly, a logical lower level controller 20LB is configured to the virtual computer 2. Similarly to the upper level controller 20LA described above, the logical lower level controller 20LB is provided with logical elements 21LB, 22LB, 23LB, 24LB, 25LB, and 26LB corresponding to the physical elements 21PB, 22PB, 23PB, 24PB, 25PB, and 26PB that are included in the physical lower level controller 20PB.

For the virtual computer 1 and the virtual computer 2, an operating system (OS) 14 and an operating system 34 are activated respectively.

A device driver 13 on the OS 14 of the virtual computer 1 recognizes a presence of the upper level controller 20PA, and issues an I/O command that specifies an address space (any of logical registers) corresponded to any of registers of the upper level controller 20PA. The I/O command is acquired by the hypervisor 50. The hypervisor 50 executes an I/O to a physical register corresponded to the port 0 in the case in which a target is a physical register corresponded to the port 0 that is coupled to the upper level controller 20PA that is assigned to the virtual computer 1 (in the case in which the specified address space is a logical register corresponded to the register). On the other hand, in the case in which a target is a physical register corresponded to the port 1 that is coupled to the lower level controller 20PB that is not assigned to the virtual computer 1, the hypervisor 50 executes any one of the following processes (A) to (D):

(A) In the case in which an I/O command is a read command and a target is a physical status register 26PA of the port 1, the physical status register 26PA of the port 1 is not accessed, and a value that means that an I/O device is not coupled to (an uncoupled value) is written to a logical status register 26LA of the port 1;

(B) In the case in which an I/O command is a write command and a target is a physical status register 26PA of the port 1, a value of a write target is not written to the physical status register 26PA of the port 1, and the write command is ignored;

(C) In the case in which an I/O command is a write command and a target is a physical port 1 switch register 28P, a value of a write target is not written to the register 28P, the value of a write target is overwritten to a value that has been stored into the management memory area 66; and (D) In the case in which an I/O command is a read command and a target is a physical port 1 switch register 28P, the register 28P is not accessed, a value that has been stored into the management memory area 66 is acquired, and the value is written to a logical port 1 switch register 28L.

By the above processing, the device driver 13 of the virtual computer 1 recognizes an I/O device 0 that is coupled to the port 0 that is coupled to the upper level controller 20PA that is assigned to the virtual computer 1, and does not recognize an I/O device 1 that is coupled to the port 1 that is coupled to the lower level controller 20PB that is not assigned to the virtual computer 1.

A device driver 33 on the OS 34 of the virtual computer 2 recognizes a presence of the lower level controller 20PB, and issues an I/O command that specifies an address space (any of logical registers) corresponded to any of registers of the lower level controller 20PB. The I/O command is acquired by the hypervisor 50. The hypervisor 50 executes an I/O to a physical register corresponded to the port 1 in the case in which a target is a physical register corresponded to the port 1 that is coupled to the lower level controller 20PB that is assigned to the virtual computer 2. On the other hand, in the case in which a target is a physical register corresponded to the port 0 that is coupled to the upper level controller 20PA that is not assigned to the virtual computer 2, the hypervisor 50 executes any one of the following processes (A) and (B):

(A) In the case in which an I/O command is a read command and a target is a physical status register 25PB of the port 0, the physical status register 26PB of the port 1 is not accessed, and a value that means that an I/O device is not coupled to (an uncoupled value) is written to a logical status register 25LB of the port 0; and (B) In the case in which an I/O command is a write command and a target is a physical status register 25PB of the port 0, a value of a write target is not written to the physical status register 25PB of the port 0, and the write command is ignored.

By the above processing, the device driver 33 of the virtual computer 2 recognizes an I/O device 1 that is coupled to the port 1 that is coupled to the lower level controller 20PB that is assigned to the virtual computer 2, and does not recognize an I/O device 0 that is coupled to the port 0 that is coupled to the upper level controller 20PA that is not assigned to the virtual computer 2.

The device driver 13 (33) on the virtual computer 1 (2) creates a data structure that is called a frame 12 (32) that operates the I/O device 0 (1) that has been recognized. The frame 12 (32) is configured in a memory space corresponded to the virtual computer 1 (2). As a value corresponded to a command register 24PA (24PB), there are a value that indicates a processing start and a value of a guest physical address (for instance, a beginning guest physical address) associated with the frame 12 (32) for instance. The writing of the values is acquired by the hypervisor 50, and the values are written to the command register 24PA (24PB) by the hypervisor 50. This leads the controller 20PA (20PB) to start a frame processing. For the frame processing, the controller 20PA (20PB) reads a command from the frame 12 (32) and writes an execution result of the command to the frame 12 (32) based on a guest physical address associated with the frame 12 (32). An access to the frame 12 (32) is executed based on a DMA. For the access, a guest physical address associated with the frame 12 (32) is specified. The guest physical address is translated into a host physical address (a physical address of the memory 55) by the DMA address translation circuit 53 according to an address translation rule corresponded to the controller 20PA (20PB) of an access source. An access to the frame 12 (32) is executed according to the host physical address after the translation. Consequently, an access destination of the upper level controller 20PA is the frame 12 of the virtual computer 1 as shown by an arrow A, and an access destination of the lower level controller 20PB is the frame 23 of the virtual computer 2 as shown by an arrow B.

A processing that is executed by the hypervisor 50 will be described in detail in the following.

Figure 4:
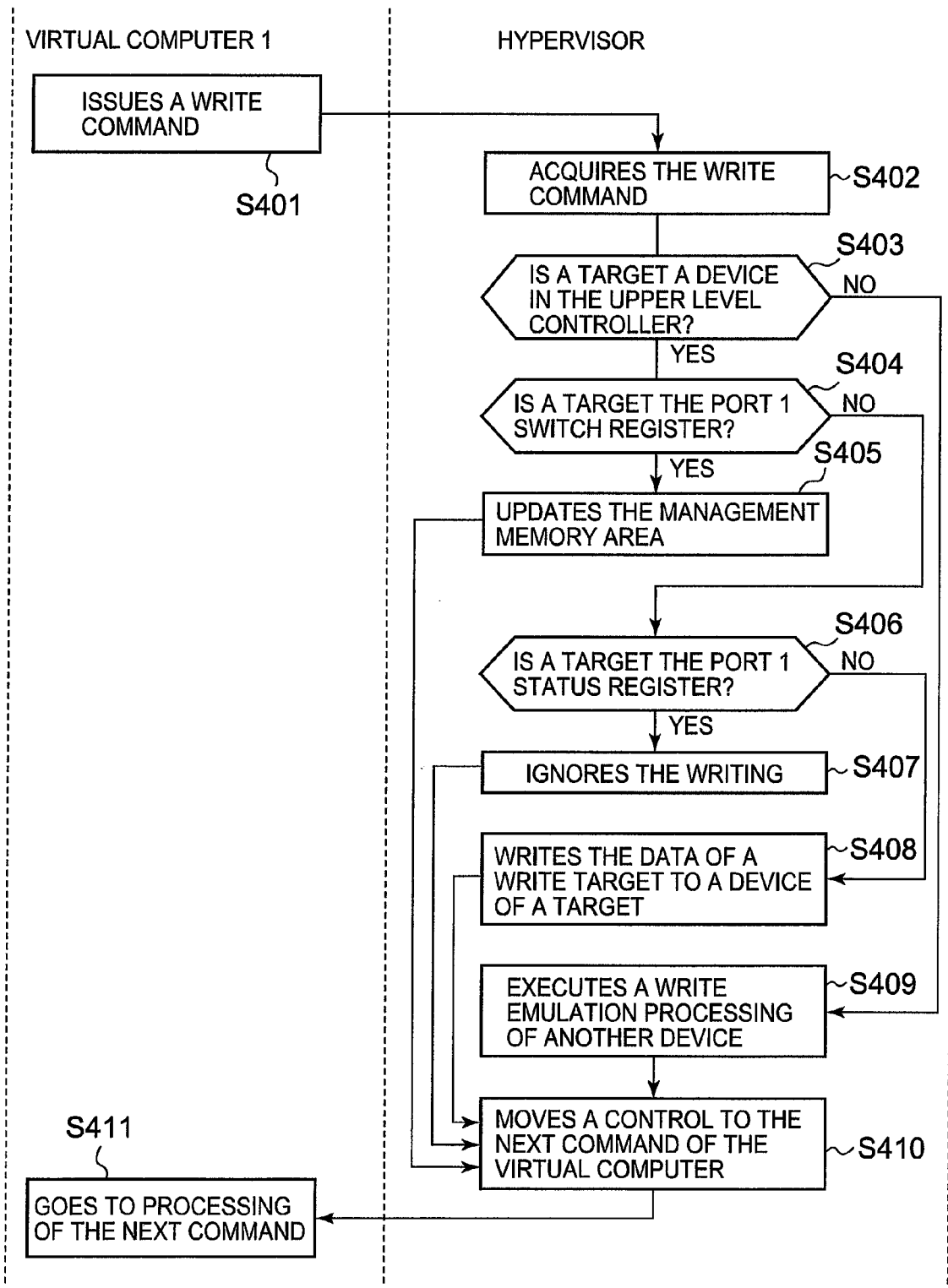
FIG. 4 is a flowchart illustrating a processing that is executed by the hypervisor 50 in the case in which a write command is issued from the virtual computer 1.

FIG. 4 is a flowchart illustrating a processing that is executed by the hypervisor 50 in the case in which a write command is issued from the virtual computer 1.

A write command that specifies an address space is issued from the virtual computer 1 (S401), and the hypervisor 50 acquires the write command (S402). The hypervisor 50 judges whether or not a target of a write is a device in the upper level controller 20PA (for instance, whether or not a target of a write is a specific MMIO space or an I/O port space) (S403).

In the case in which the result of the judgment of the S403 is positive (S403: YES), the hypervisor 50 judges whether or not a target of a write is the port 1 switch register 28P (S404).

In the case in which the result of the judgment of the S404 is positive (S404: YES), the hypervisor 50 does not write to the port 1 switch register 28P, and overwrites a value of a write target to a value that is held in the management memory area 66 (S405). Subsequently, a control is moved to the next command of the virtual computer 1 (S410). The virtual computer 1 executes a processing of the next command (S411).

In the case in which the result of the judgment of the S404 is negative (S404: NO), the hypervisor 50 judges whether or not a target of a write is the port 1 status register 26PA (S406).

In the case in which the result of the judgment of the S406 is positive (S406: YES), the hypervisor 50 does not write to the port 1 status register 26PA, and ignores the writing (S407). Subsequently, the S410 is executed.

In the case in which the result of the judgment of the S406 is negative (S406: NO), the hypervisor 50 writes the data of a write target to a device of a target (S408). Subsequently, the S410 is executed.

In the case in which the result of the judgment of the S403 is negative (S403: NO), the hypervisor 50 executes a write emulation processing that complies with the write command. Subsequently, the S410 is executed.

Figure 5:
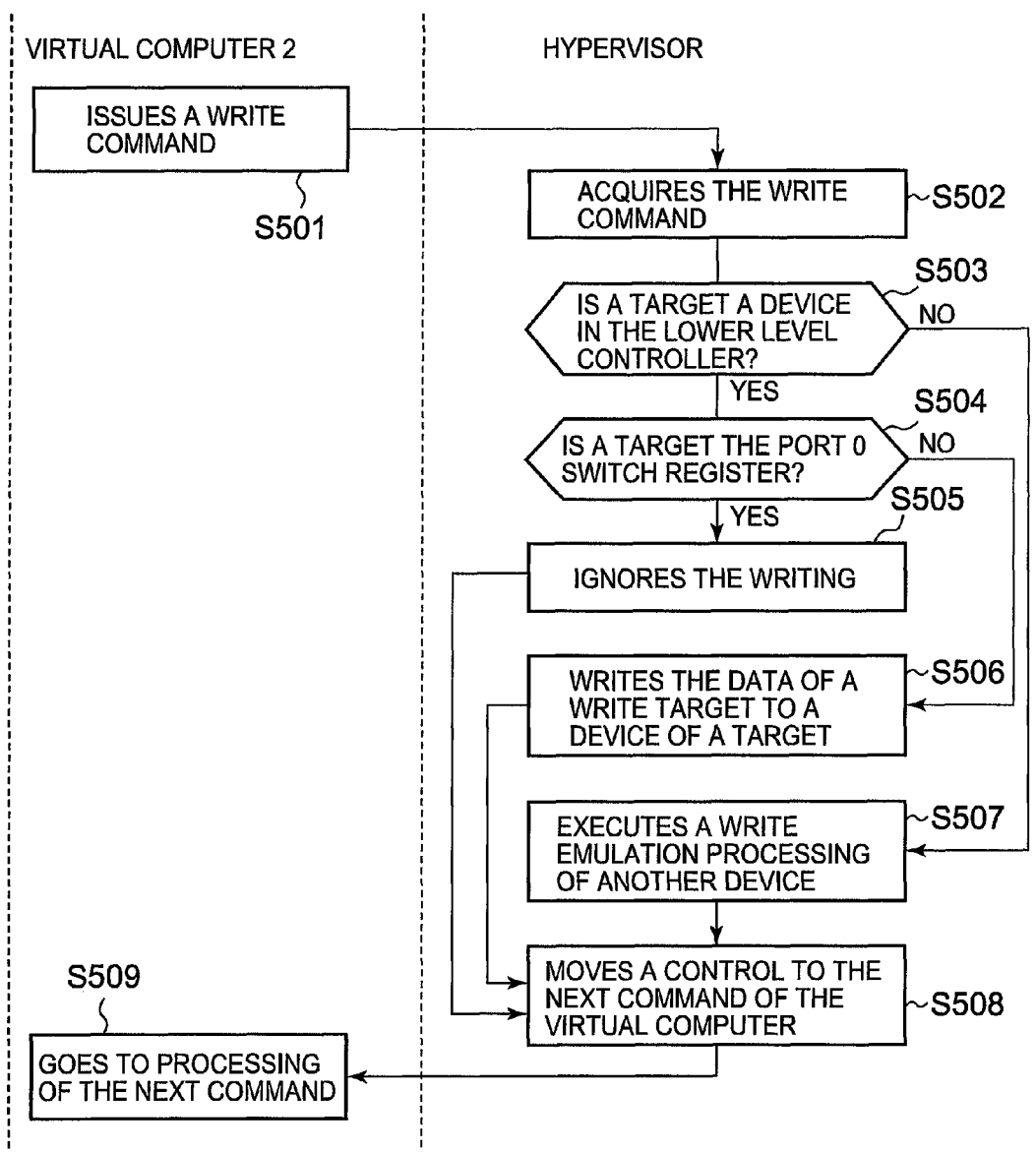
FIG. 5 is a flowchart illustrating a processing that is executed by the hypervisor 50 in the case in which a write command is issued from the virtual computer 2.

FIG. 5 is a flowchart illustrating a processing that is executed by the hypervisor 50 in the case in which a write command is issued from the virtual computer 2.

A write command that specifies an address space is issued from the virtual computer 2 (S501), and the hypervisor 50 acquires the write command (S502). The hypervisor 50 judges whether or not a target of a write is a device in the lower level controller 20PB (for instance, whether or not a target of a write is a specific MMIO space or an I/O port space) (S503).

In the case in which the result of the judgment of the S503 is positive (S503: YES), the hypervisor 50 judges whether or not a target of a write is the port 0 status register 25PB (S504).

In the case in which the result of the judgment of the S504 is positive (S504: YES), the hypervisor 50 does not write to the port 0 status register 25PB, and ignores the writing (S505). Subsequently, a control is moved to the next command of the virtual computer 2 (S508). The virtual computer 2 executes a processing of the next command (S509).

In the case in which the result of the judgment of the S504 is negative (S504: NO), the hypervisor 50 writes the data of a write target to a device of a target (S506). Subsequently, the S508 is executed.

In the case in which the result of the judgment of the S503 is negative (S503: NO), the hypervisor 50 executes a write emulation processing that complies with the write command. Subsequently, the S508 is executed.

Figure 6:
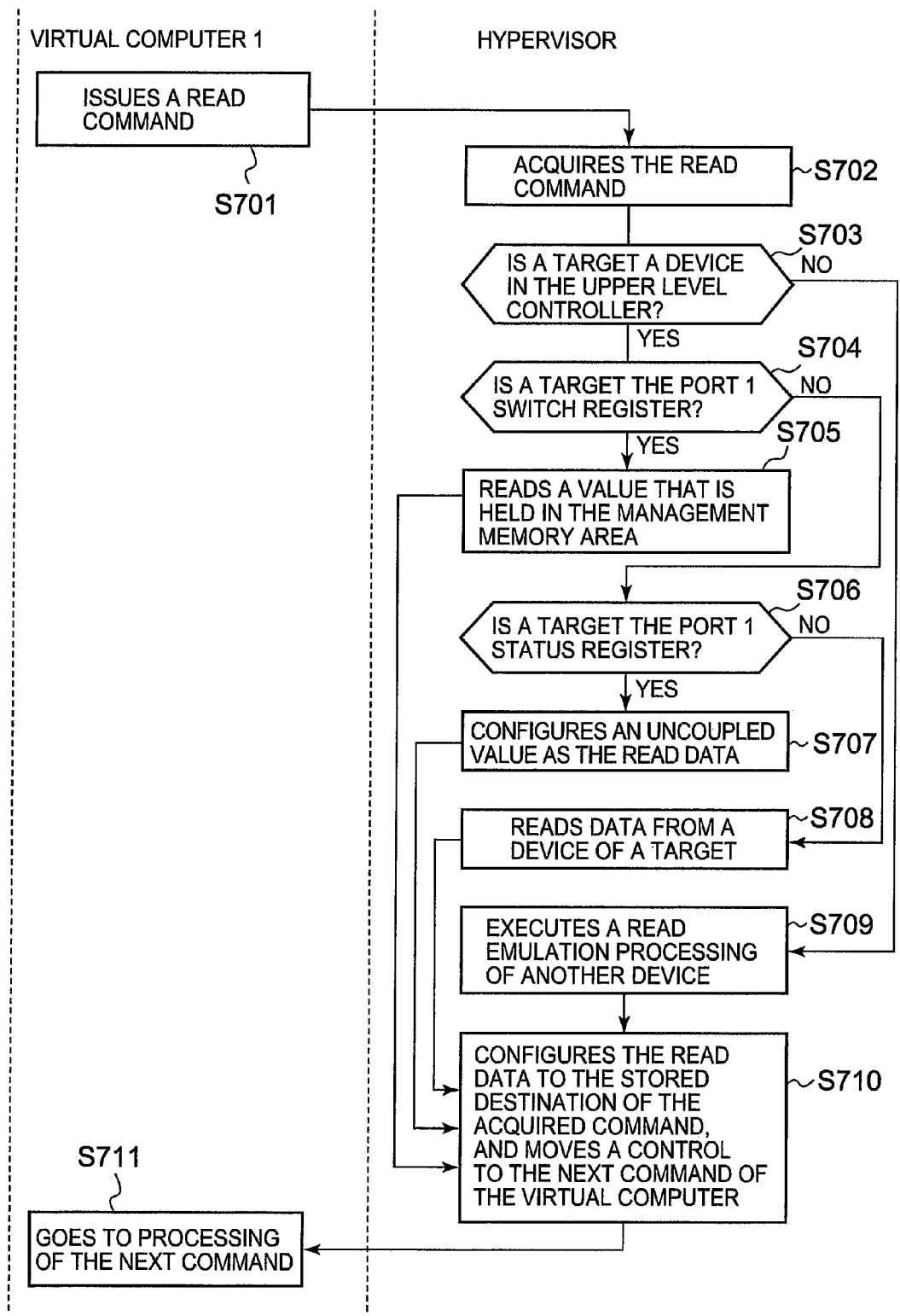
FIG. 6 is a flowchart illustrating a processing that is executed by the hypervisor 50 in the case in which a read command is issued from the virtual computer 1.

FIG. 6 is a flowchart illustrating a processing that is executed by the hypervisor 50 in the case in which a read command is issued from the virtual computer 1.

A read command that specifies an address space is issued from the virtual computer 1 (S701), and the hypervisor 50 acquires the read command (S702). The hypervisor 50 judges whether or not a target of a read is a device in the upper level controller 20PA (S703).

In the case in which the result of the judgment of the S703 is positive (S703: YES), the hypervisor 50 judges whether or not a target of a read is the port 1 switch register 28P (S704).

In the case in which the result of the judgment of the S704 is positive (S704: YES), the hypervisor 50 does not read from the port 1 switch register 28P, and reads a value that is held in the management memory area 66 (S705). Subsequently, the hypervisor 50 configures the read data to the stored destination of the acquired command, and a control is moved to the next command of the virtual computer 1 (S710). The data here is a value that has been read from the management memory area 66, and the stored destination is the logical port 1 switch register 28L. After the S710, the virtual computer 1 executes a processing of the next command (S711).

In the case in which the result of the judgment of the S704 is negative (S704: NO), the hypervisor 50 judges whether or not a target of a read is the port 1 status register 26PA (S706).

In the case in which the result of the judgment of the S706 is positive (S706: YES), the hypervisor 50 does not read from the port 1 status register 26PA, and configures a value that means that an I/O device is not coupled to (an uncoupled value) as the read data (S707). Subsequently, the S710 is executed. For the S710, the uncoupled value is stored into the logical port 1 status register 26LA.

In the case in which the result of the judgment of the S706 is negative (S706: NO), the hypervisor 50 reads the data from a device of a target (S708). Subsequently, the S710 is executed.

In the case in which the result of the judgment of the S703 is negative (S703: NO), the hypervisor 50 executes a read emulation processing that complies with the read command. Subsequently, the S710 is executed.

Figure 7:
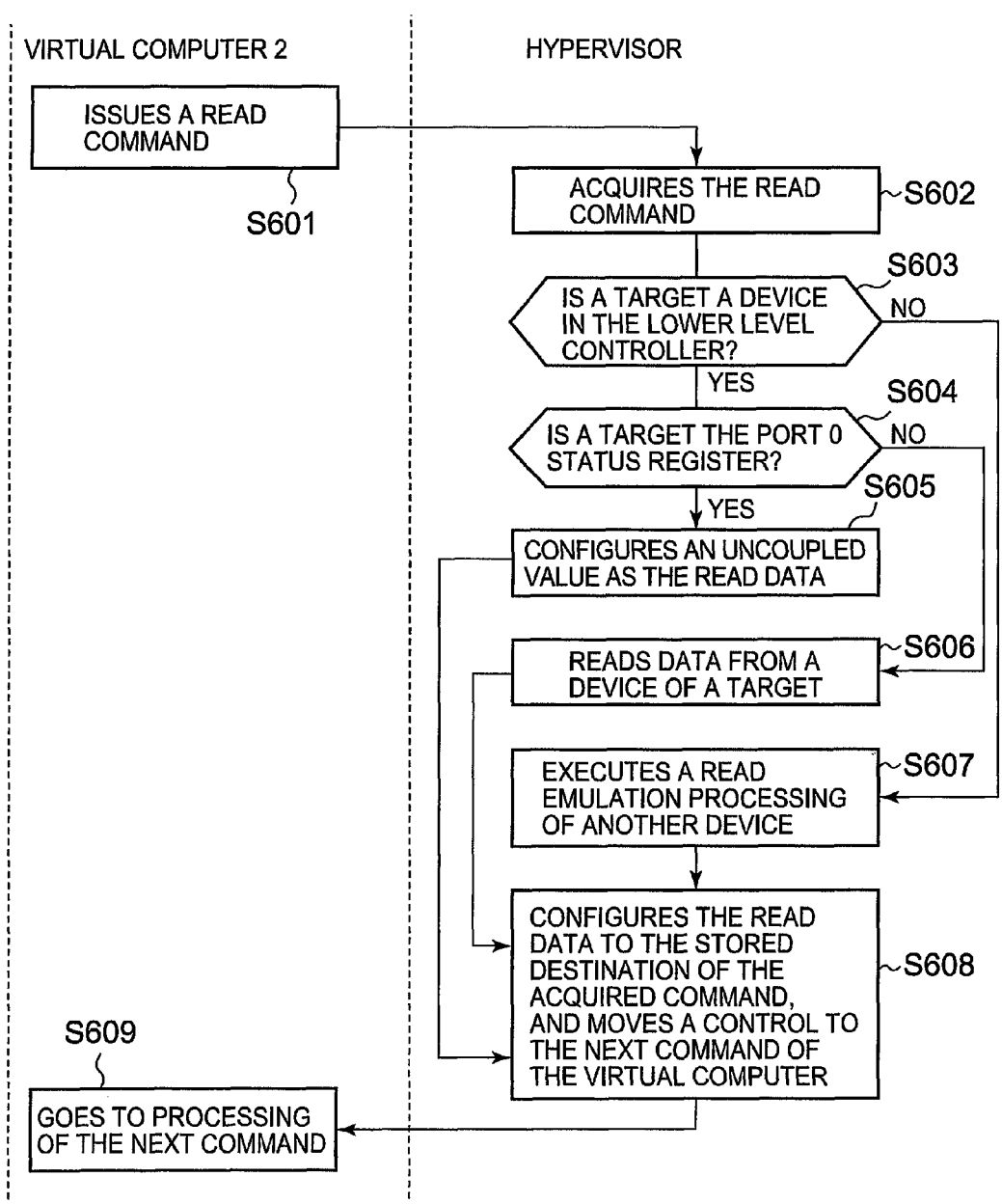
FIG. 7 is a flowchart illustrating a processing that is executed by the hypervisor 50 in the case in which a read command is issued from the virtual computer 2.

FIG. 7 is a flowchart illustrating a processing that is executed by the hypervisor 50 in the case in which a read command is issued from the virtual computer 2.

A read command that specifies an address space is issued from the virtual computer 2 (S601), and the hypervisor 50 acquires the read command (S602). The hypervisor 50 judges whether or not a target of a read is a device in the lower level controller 20PB (S603).

In the case in which the result of the judgment of the S603 is positive (S603: YES), the hypervisor 50 judges whether or not a target of a read is the port 0 status register 25PB (S604).

In the case in which the result of the judgment of the S604 is positive (S604: YES), the hypervisor 50 does not read from the port 0 status register 25PB, and configures a value that means that an I/O device is not coupled to (an uncoupled value) as the read data (S605). Subsequently, the S608 is executed. For the S608, the uncoupled value is stored into the logical port 1 status register 26LA. After the S608, the virtual computer 2 executes a processing of the next command (S609).

In the case in which the result of the judgment of the S604 is negative (S604 NO), the hypervisor 50 reads the data from a device of a target (S606). Subsequently, the S608 is executed.

In the case in which the result of the judgment of the S603 is negative (S603: NO), the hypervisor 50 executes a read emulation processing that complies with the read command. Subsequently, the S608 is executed.

The above described the explanation of an embodiment 1.

Embodiment 2

An embodiment 2 in accordance with the present invention will be described below in detail. In that case, a difference from the embodiment 1 will be described mainly, and the detailed descriptions of the common points with the embodiment 1 will be omitted or simplified (this is similar for an embodiment 3 described later).

Figure 8:
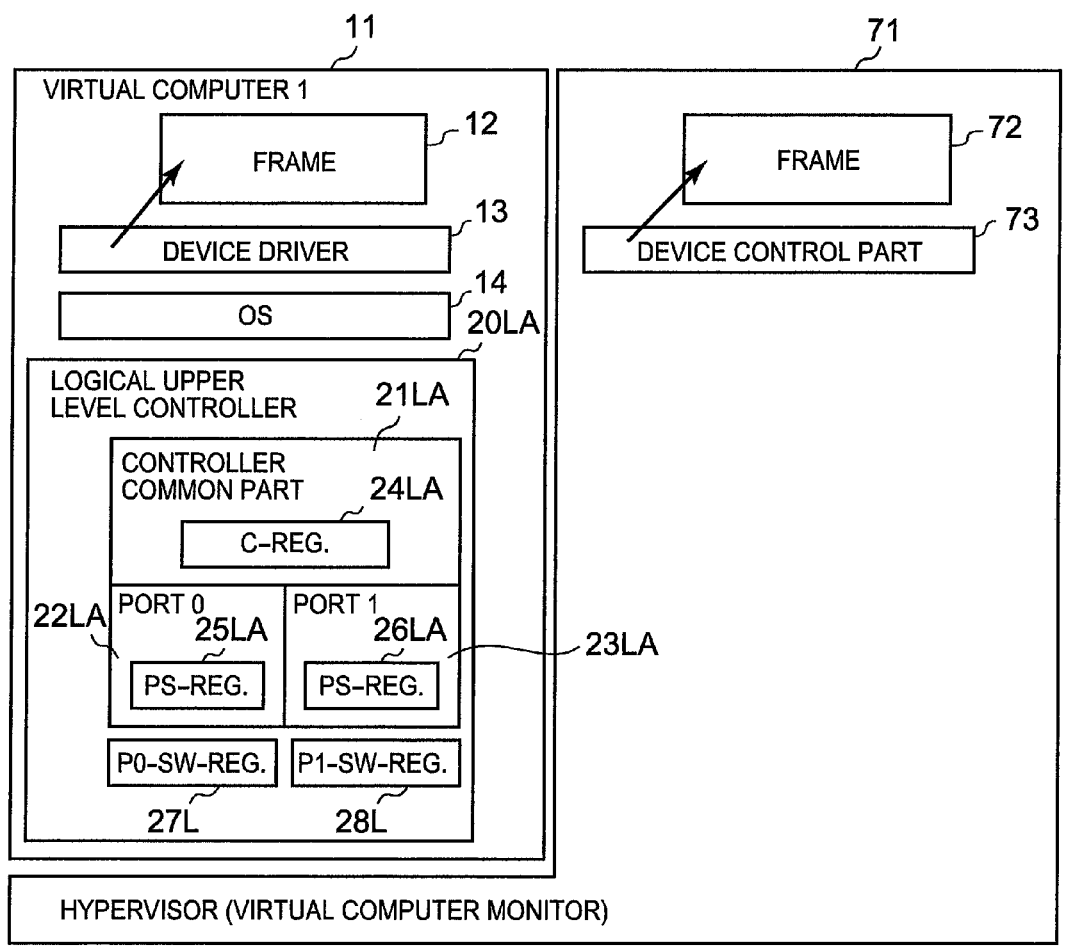
FIG. 8 shows a virtual computer 1 and a hypervisor 71 for a computer system in accordance with an embodiment 2 of the present invention.

FIG. 8 shows a virtual computer 1 and a hypervisor 71 for a computer system in accordance with the embodiment 2 of the present invention. The figure of the configuration of the physical computer system is omitted since the configuration is equivalent to that of the embodiment 1.

For the embodiment 2, the lower level controller 20PB is assigned to the hypervisor 71 as substitute for the virtual computer. By this configuration, the I/O devices 0 and 1 of the coupled destination can be separately utilized between the hypervisor 71 and the virtual computer 1.

The hypervisor 71 is provided with a device control part 73. The device control part 73 knows which of the ports 0 and 1 cannot be used by the hypervisor 71. Consequently, it is not necessary to emulate the port status registers 25PB and 26PB for the lower level controller 20PB. It is preferable that the hypervisor 71 does not access the register 25PB in the lower level controller 20PB associated with the port 0 that is not used by the hypervisor 71 in such a manner that the virtual computer 1 that uses the upper level controller 20PA that is not assigned to the hypervisor 71 is not influenced.

The above described the explanation of an embodiment 2. Moreover, the upper level controller 20PA as substitute for the lower level controller 20PB can also be assigned to the hypervisor 71, and the virtual computer can also be assigned to the lower level controller 20PB. In this case, it is preferable that the hypervisor 71 does not access the registers 23PA and 28P in the upper level controller 20PA associated with the port 1 that is not used by the hypervisor 71.

Embodiment 3

Figure 9:
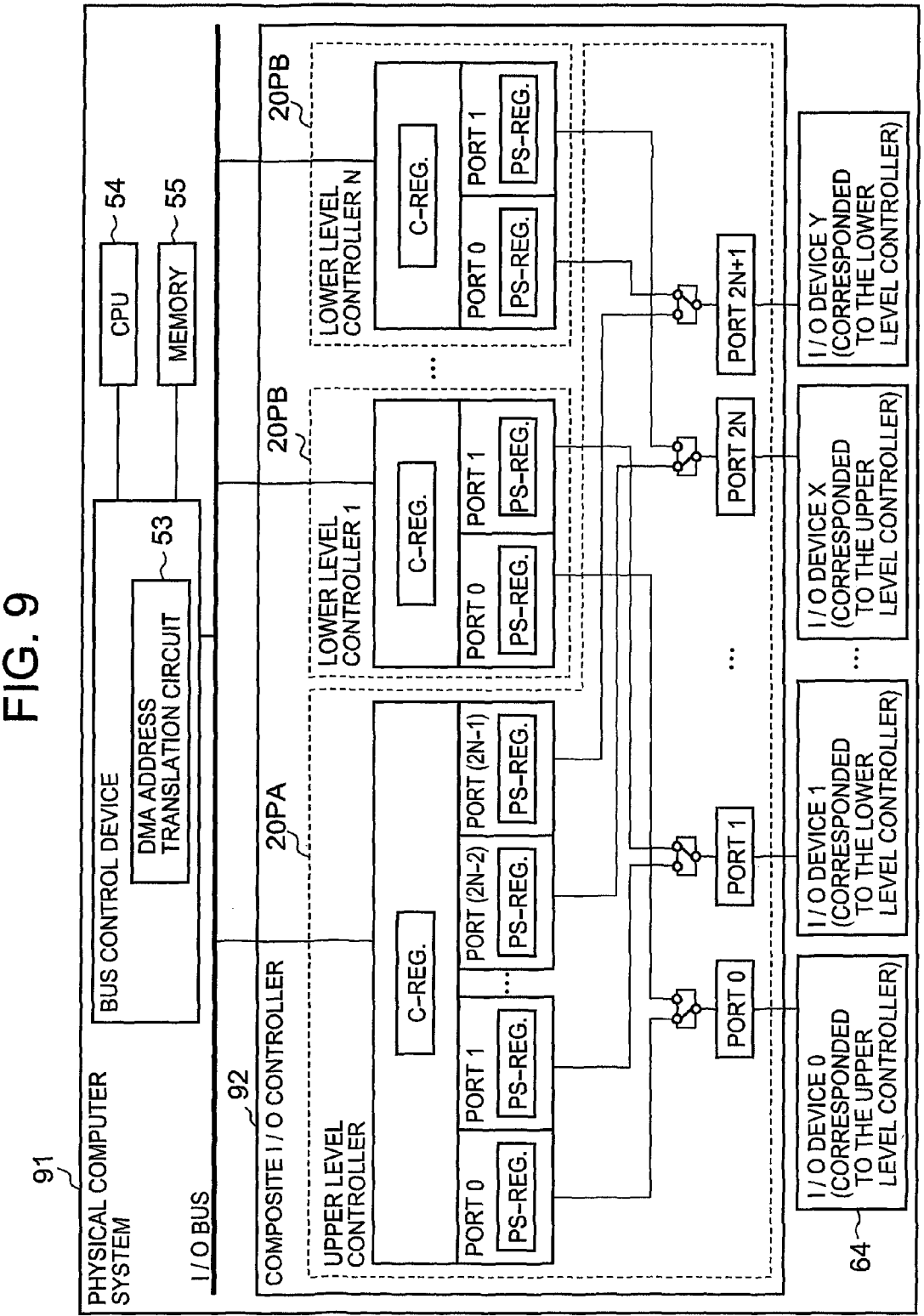
FIG. 9 shows the configuration of a physical computer system 91 for a computer system in accordance with an embodiment 3 of the present invention.
Figure 10:
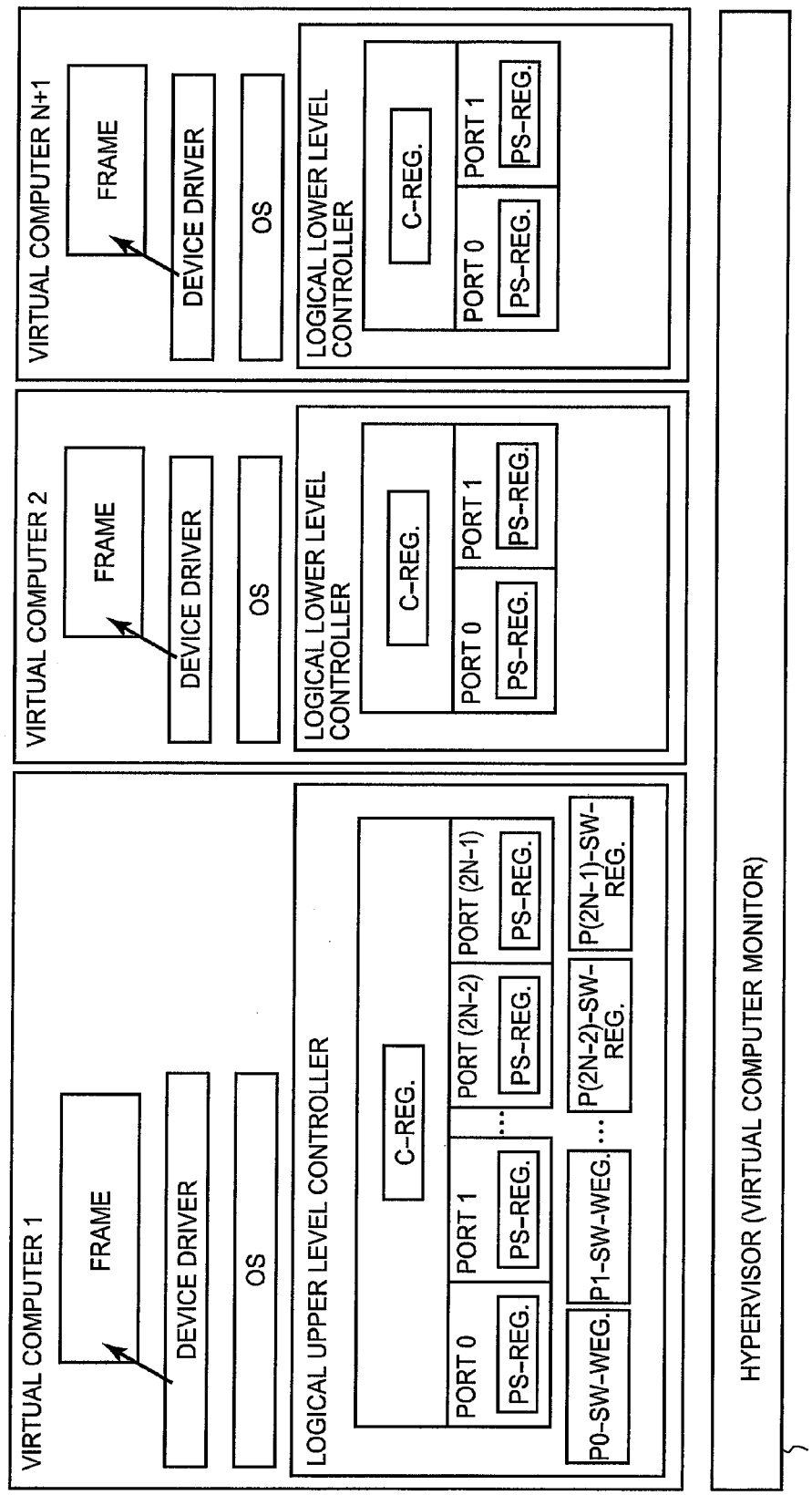
FIG. 10 shows the configurations of a hypervisor 50 and a virtual computer for a computer system in accordance with an embodiment 3 of the present invention.

FIG. 9 shows the configuration of a physical computer system 91 for a computer system in accordance with an embodiment 3 of the present invention. FIG. 10 shows the configurations of a hypervisor 50 and a virtual computer for a computer system in accordance with an embodiment 3 of the present invention.

As shown in FIG. 9, a composite I/O controller 92 is provided with N lower level controllers 20PB (N is an integer number of at least 2). One upper level controller 20PA and N lower level controllers 20PB are assigned to (N+1) virtual computers on one-to-one. Like the embodiment 2, any one of I/O controllers can also be assigned to the hypervisor.

The configuration of each lower level controller 20PB is a configuration that can share two I/O ports. Consequently, one lower level controller 20PB is provided with two I/O ports. Therefore, in the case in which there are N lower level controllers 20PB, 2N ports from a port 0 to a port (2N−1) are provided.

Even in the case in which the composite I/O controller 92 is provided with a plurality of lower level controllers 20PB, it can be ensured that an individual virtual computer can separately utilize an I/O device. This is because a virtual computer (or a hypervisor) to which the upper level controller 20PA is assigned does not access a register associated with a port that is coupled to the lower level controller 20PB that is not assigned to the virtual computer (or the hypervisor).

While the preferred embodiments in accordance with the present invention have been described above, the present invention is not restricted to the embodiments, and various changes, modifications, and functional additions can be thus made without departing from the scope of the present invention.

What is claimed is:

1. A hypervisor that manages a virtual computer that is assigned to an I/O controller in a composite I/O controller, comprising:
   an acquisition part that acquires an I/O (Input/Output) command that is issued from the virtual computer;
   a judgment part that judges whether or not a target of an I/O that complies with the I/O command is an unassigned port associated device that is a device associated with an I/O port that is coupled to an I/O controller that is not assigned to a virtual computer that is an issuing source of the I/O command; and
   a command processing part that does not execute an I/O to the unassigned port associated device and returns a virtual execution result to a virtual computer that is an issuing source of the I/O command in the casein which the result of the judgment is positive,
   wherein the composite I/O controller is provided with a plurality of I/O controllers and a plurality of I/O ports that can be shared by each I/O controller,
   at least one of the plurality of the I/O controllers is assigned to any one of virtual computers, and
   any one of I/O devices and any one of the plurality of the I/O controllers are coupled to each I/O port.

* * * * *